US012736077B2

(12) United States Patent
Su et al.

(10) Patent No.: US 12,736,077 B2
(45) Date of Patent: Sep. 15, 2026

(54) SCREW

(71) Applicant: TAIWAN SHAN YIN INTERNATIONAL CO., LTD., Kaohsiung City (TW)

(72) Inventors: Kou-Tsair Su, Kaohsiung City (TW); Chen-Long Su, Kaohsiung City (TW)

(73) Assignee: Taiwan Shan Yin International Co., Ltd., Kaohsiung City (TW)

( * ) Notice: Subject to any disclaimer, the term of this patent is extended or adjusted under 35 U.S.C. 154(b) by 489 days.

(21) Appl. No.: 18/529,397

(22) Filed: Dec. 5, 2023

(65) Prior Publication Data

US 2025/0180057 A1 Jun. 5, 2025

(51) Int. Cl.
*F16B 25/00* (2006.01)
*F16B 25/10* (2006.01)

(52) U.S. Cl.
CPC ........ *F16B 25/0042* (2013.01); *F16B 25/103* (2013.01)

(58) Field of Classification Search
CPC . F16B 25/103; F16B 25/0042; F16B 25/0084
See application file for complete search history.

(56) References Cited

U.S. PATENT DOCUMENTS

| | | | |
|---|---|---|---|
| 4,536,117 A | 8/1985 | Yamashiro | |
| 4,697,969 A * | 10/1987 | Sparkes | F16B 25/0078 411/421 |
| 6,158,939 A | 12/2000 | Grossberndt et al. | |
| 9,822,810 B2 * | 11/2017 | Su | F16B 25/0015 |
| 2002/0081171 A1 | 6/2002 | Werner et al. | |
| 2012/0183371 A1 | 7/2012 | Druschel et al. | |
| 2021/0277926 A1 * | 9/2021 | Huang | F16B 25/103 |

FOREIGN PATENT DOCUMENTS

| | | |
|---|---|---|
| EP | 0133773 A1 | 3/1985 |
| EP | 0713017 A2 | 5/1996 |
| JP | H09291918 A | 11/1997 |
| WO | WO2017159896 A1 | 9/2017 |
| WO | WO2017159897 A1 | 9/2017 |

* cited by examiner

*Primary Examiner* — Zakiya W Bates
(74) *Attorney, Agent, or Firm* — Rosenberg, Klein & Lee

(57) ABSTRACT

A screw includes a shank, a head and a drill portion joined to opposite ends of the shank, thread convolutions spiraled on the shank, ribs protruding from the shank, a discharging portion formed between any two adjacent ribs, and cutting portions formed on the thread convolutions. Each thread convolution has two thread flanks converging at a thread crest and forms respective thread roots by which different vertical distances are defined. One of the thread flanks includes flank sections having different flank angles. Therefore, the thread convolutions are asymmetric. The discharging portion has two inclined surfaces connected to the ribs and an accommodation groove formed therebetween.

8 Claims, 10 Drawing Sheets

SCREW

BACKGROUND OF THE INVENTION

1. Field of the Invention

This invention relates to a screw and relates particularly to a screw capable of quickly moving chips outwards, attaining a tight engagement with a workpiece, reducing the screwing resistance, and improving the cutting efficiency and the pull-out resistance whereby the screw is not easily pulled out of the workpiece.

2. Description of the Related Art

Referring to FIGS. 1 and 2, a conventional screw 1 comprises a shank 11 having a first end and a second end opposite to the first end, a head 12 disposed on the first end of the shank 11, a drill portion 13 disposed on the second end of the shank 11, and a plurality of thread convolutions 14 spirally disposed on the shank 11 between the first end and the second end. Each thread convolution 14 has an upper thread flank 141 extending outwards from the shank 11 and facing the head 12, a lower thread flank 142 extending outwards from the shank 11 and facing the drill portion 13, and a thread crest 143 formed along a junction of the upper thread flank 141 and the lower thread flank 142. During a screwing operation, the drill portion 13 is situated at a surface of a workpiece 2. A rotational force is applied on the head 12 to carry out a drilling operation of the drill portion 13. The thread convolutions 14 then cut into the workpiece 2 to further screw the screw 1 into workpiece 2 gradually so that the screwing operation is completed.

However, spaces provided by the screw 1 for accommodating and excluding chips are not enough. Chips generated during the screwing operation cannot be moved outwards timely, and that will increase the screwing resistance and reduce the screwing speed when the screw 1 keeps screwing downwards and pressing the accumulated chips. If the screw 1 keeps pressing the chips, the workpiece 2 may crack. Meanwhile, the screw 1 cannot hold the chips sufficiently, and that will result in poor engagement between the screw 1 and the workpiece 2. Thus, the pull-out resistance of the screw 1 is not good, and the screw 1 may be easily pulled out of the workpiece 2. Further, the upper thread flank 141 and the lower thread flank 142 extend by the same inclined angle and converge at the thread crest 143 whereby the thread convolutions 14 are provided with a symmetrical arrangement. The symmetrical arrangement of the thread convolutions 14 is incapable of cutting into the workpiece 2 effectively, and that requires to be improved.

SUMMARY OF THE INVENTION

The object of this invention is to provide a screw capable of improving cutting efficiency, attaining a tight engagement with a workpiece, providing enough spaces for chips accommodation and exclusion to thereby reduce screwing resistance and enhance pull-out resistance whereby the screw is not easily pulled out of the workpiece.

The screw of this invention comprises a shank having opposite first and second ends, a head formed on the first and, a drill portion formed on the second end, a plurality of thread convolutions spiraled on the shank and axially spaced apart, a plurality of ribs formed by projecting outwards from an outer periphery of the shank, and a discharging portion formed between any two adjacent ribs. The shank defines a central axis. The ribs extend between the thread convolutions in an extension direction which is non-parallel to the central axis of the shank. Each thread convolution has a first thread flank and a second thread flank respectively extending outwards from the shank and facing opposite directions. The first thread flank and the second thread flank converge at a thread crest which defines a baseline perpendicular to the central axis of the shank. The first thread flank and the shank connect at a first thread root. The second thread flank and the shank connect at a second thread root. A vertical distance defined between the first thread root and the baseline is different from a vertical distance defined between the second thread root and the baseline. Each first thread flank has a first flank section connected to the shank and a second flank section connected to the first flank section. A flank angle defined between the first flank section and the baseline is different from a flank angle defined between the second flank section and the baseline. A plurality of cutting portions are provided on respective thread crests corresponding to at least two thread convolutions. The discharging portion has an accommodation groove extending between the thread convolutions and two inclined surfaces respectively connected between the accommodation groove and the ribs. The ribs and the cutting portions assist the thread convolutions in cutting, thereby increasing the cutting efficiency. Chips caused by cutting a workpiece are guided by the inclined surfaces into the accommodation groove to further move the chips outwards quickly, thereby reducing the screwing resistance, accelerating the screwing operation, and preventing the workpiece from cracking. Besides, the remaining chips are accommodated within the inclined surfaces, the accommodation groove, and the cutting portions after the screwing operation is complete, thereby attaining a tight engagement between the screw and the workpiece. Further, different vertical distances and different flank angles provide an asymmetric arrangement of the thread convolutions, thereby improving the cutting efficiency and cutting effect, allowing the screw to engage with the workpiece tightly, and increasing the pull-out resistance of the screw whereby the screw is not easily pulled out.

Preferably, the first thread flank of each thread convolution faces the head.

Preferably, the thread convolutions include a first plurality of thread convolutions and a second plurality of thread convolutions formed between the first plurality of thread convolutions. Each first thread flank of each first plurality of thread convolutions faces the head. Each first thread flank of each second plurality of thread convolutions faces the drill portion.

Preferably, the vertical distance defined between the first thread root and the baseline is greater than the vertical distance defined between the second thread root and the baseline.

Preferably, the flank angle defined between the first flank section and the baseline is greater than the flank angle defined between the second flank section and the baseline.

Preferably, the drill portion has a drill body connected to the second end of the shank and two opposite slots recessedly formed on the drill body. Each slot is communicated with each accommodation groove of each discharging portion, thereby guiding chips caused by cutting the workpiece into the accommodation groove with the aid of the two slots.

Preferably, each cutting portion has at least one first notch and a plurality of second notches formed on two sides of each first notch. Each first notch is recessed into the thread crest, thereby defining two cutting edges.

Preferably, the cutting portions are spaced from each other. Each first notch is curved in shape.

DETAILED DESCRIPTION OF THE PREFERRED EMBODIMENTS

Figure 1:
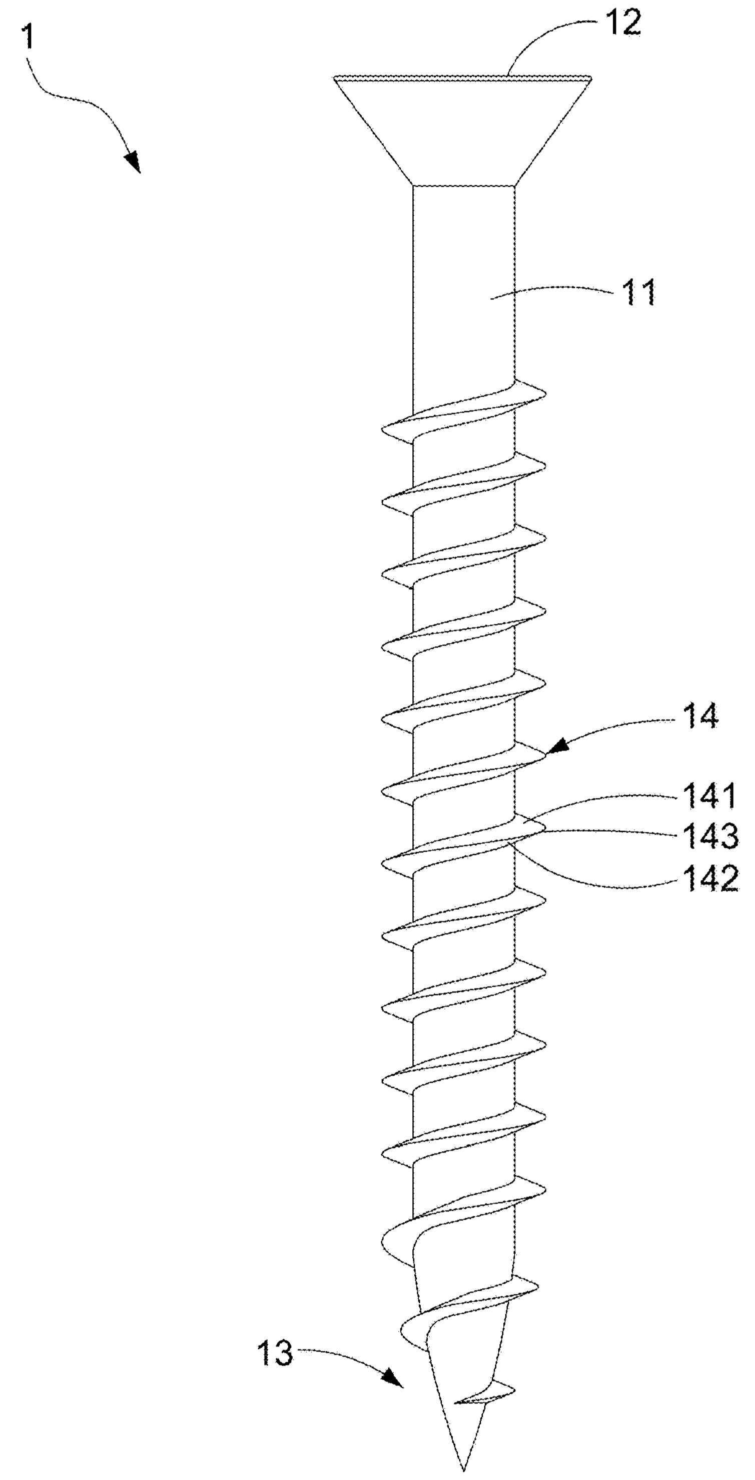
FIG. 1 is a schematic view showing a conventional screw.
Figure 2:
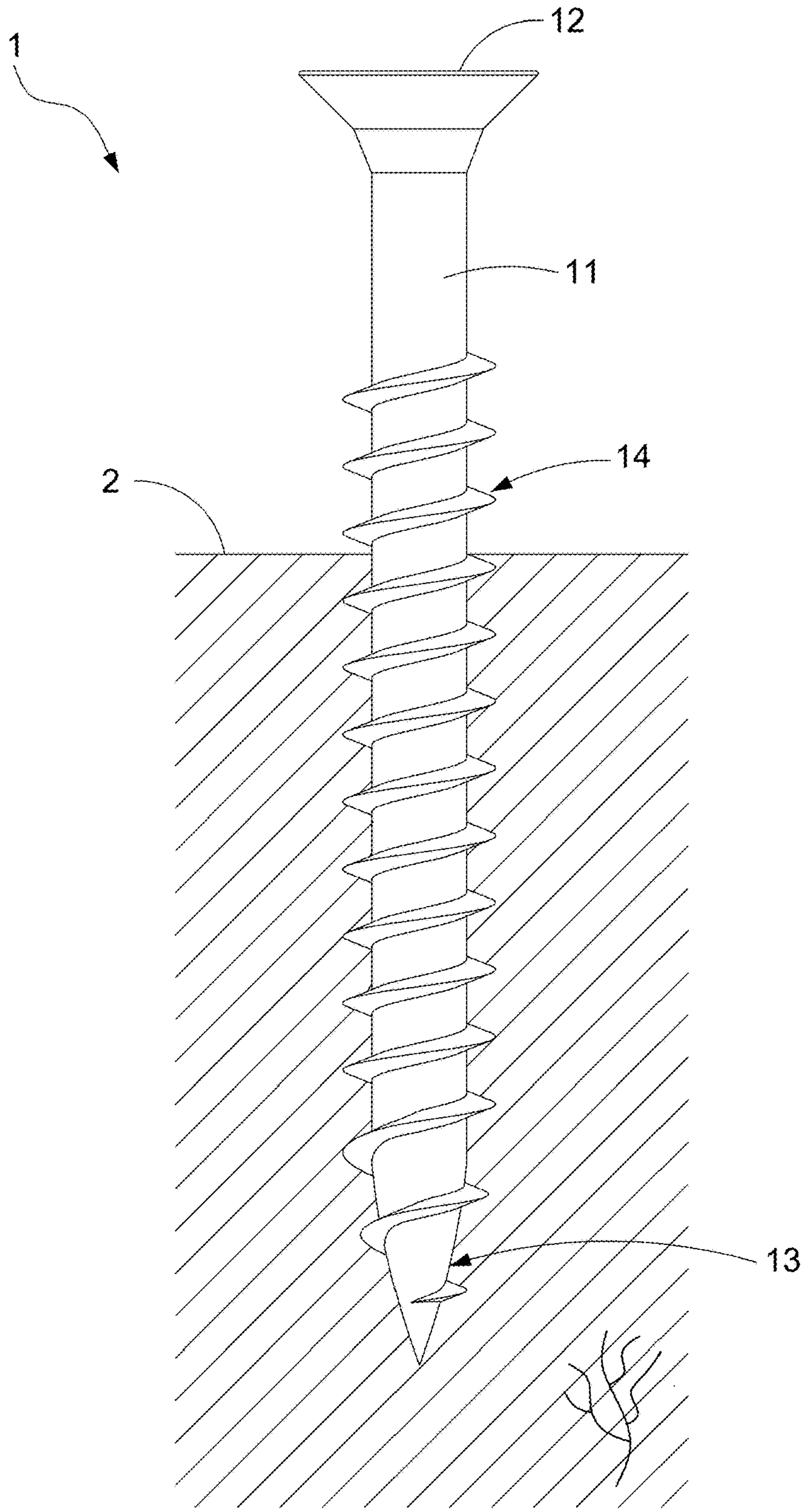
FIG. 2 is a schematic view showing a screwing operation of the conventional screw.

Referring to FIGS. 3, 3A, 3B and 4, a first preferred embodiment of a screw 3 of this invention is disclosed. The screw 3 includes a shank 31 having a first end and a second end opposite to the first end, a head 32 formed on the first end of the shank 31, a drill portion 33 formed on the second end of the shank 31, a plurality of thread convolutions 34 spirally formed on the shank 31 between the first end and the second end, and a plurality of ribs 35 formed by projecting outwards from an outer periphery of the shank 31. The shank 31 defines a central axis L. The ribs 35 stretch between the thread convolutions 34 in an extension direction which is non-parallel to the central axis L of the shank 31. A discharging portion 36 is formed between any two adjacent ribs 35. In this preferred embodiment, four ribs 35 are symmetrically arranged on the shank 31. The type of the drill portion 33 can be varied according to needs such as a dill tail, a pointed tail, and so on. Here takes that the drill portion 33 is a pointed tail as an example.

Figures 3, 3A, 3B:
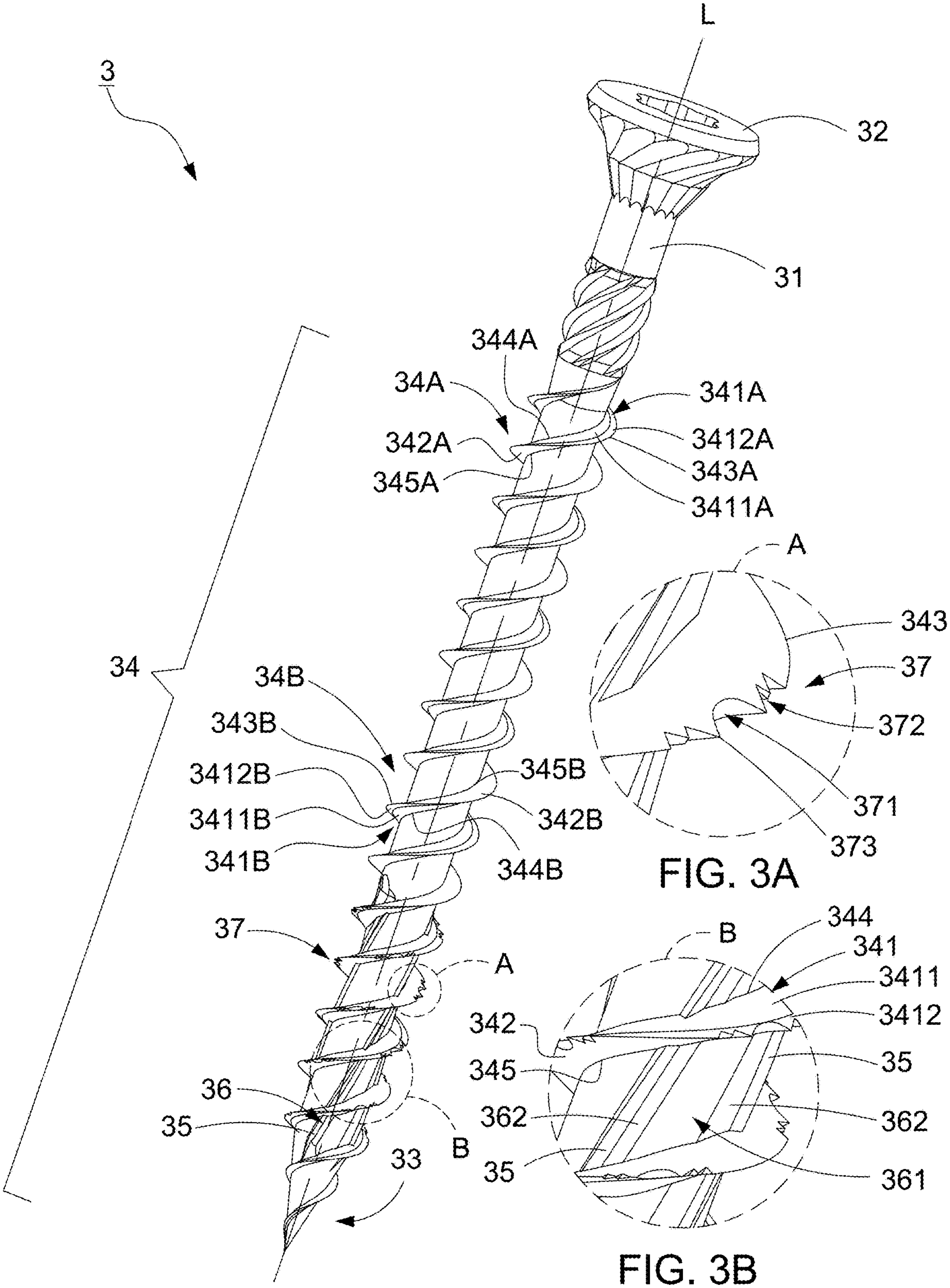
FIG. 3 is a perspective view showing a first preferred embodiment of this invention.
FIG. 3A is an enlarged view of the encircled portion A indicated in FIG. 3.
FIG. 3B is an enlarged view of the encircled portion B indicated in FIG. 3.
Figure 6:
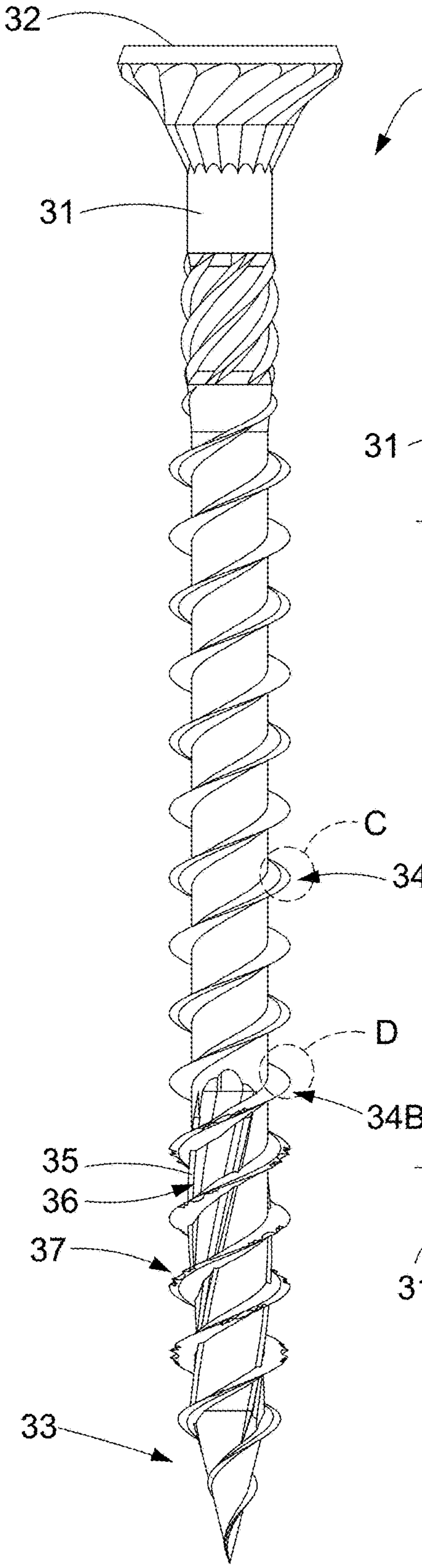
FIG. 6 is a schematic view showing the first preferred embodiment of this invention.
Figure 6A:
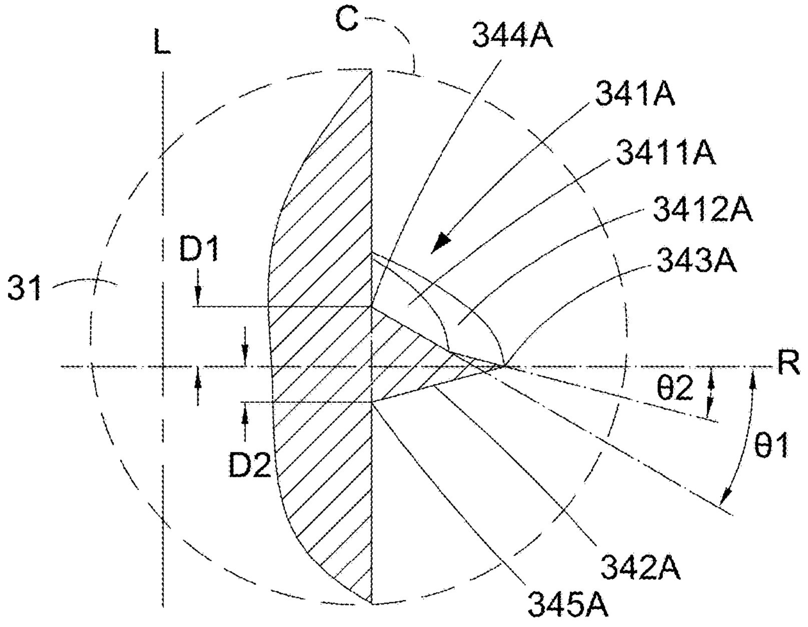
FIG. 6A is an enlarged view of the encircled portion C indicated in FIG. 6.
Figure 6B:
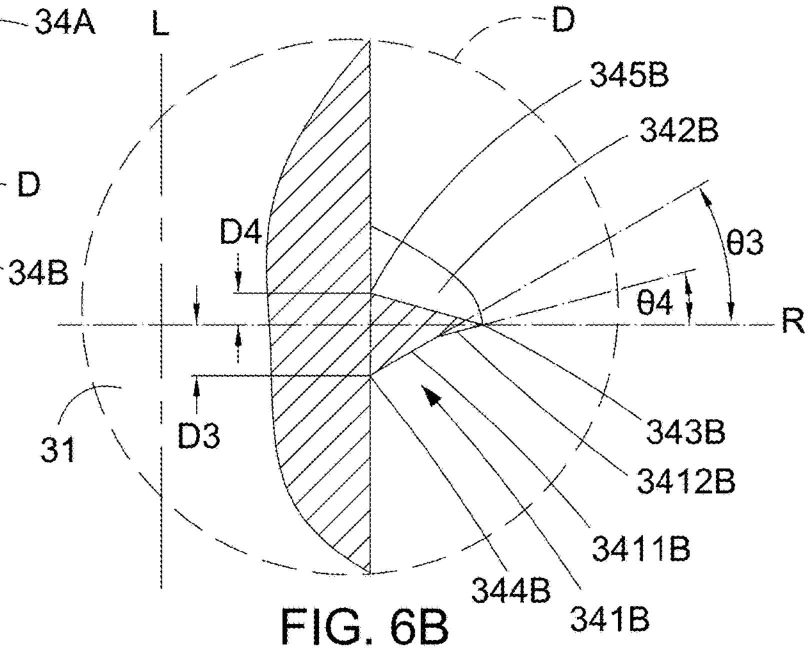
FIG. 6B is an enlarged view of the encircled portion D indicated in FIG. 6.

Each thread convolution 34 has a first thread flank 341 extending outwards from the shank 31, a second thread flank 342 extending outwards from the shank 31 and facing a direction opposite to a direction of the first thread flank 341, and a thread crest 343 formed at a convergence of the first thread flank 341 and the second thread flank 342. A plurality of cutting portions 37 are formed on respective thread crests 343 corresponding to at least two thread convolutions 34 as shown in FIGS. 3 and 3A. Referring to FIGS. 6, 6A and 6B, the thread crest 343 defines a baseline R which is perpendicular to the central axis L of the shank 31. The first thread flank 341 and the outer periphery of the shank 31 meets at a first thread root 344. The second thread flank 342 and the outer periphery of the shank 31 meets at a second thread root 345. A vertical distance defined between the first thread root 344 and the baseline R is different from a vertical distance defined between the second thread root 345 and the baseline R. The first thread flank 341 of each thread convolution 34 has a first flank section 3411 connected to the shank 31 and a second flank section 3412 connected to the first flank section 3411. A flank angle defined between the first flank section 3411 and the baseline R is different from a flank angle defined between the second flank section 3412 and the baseline R.

Figure 4:
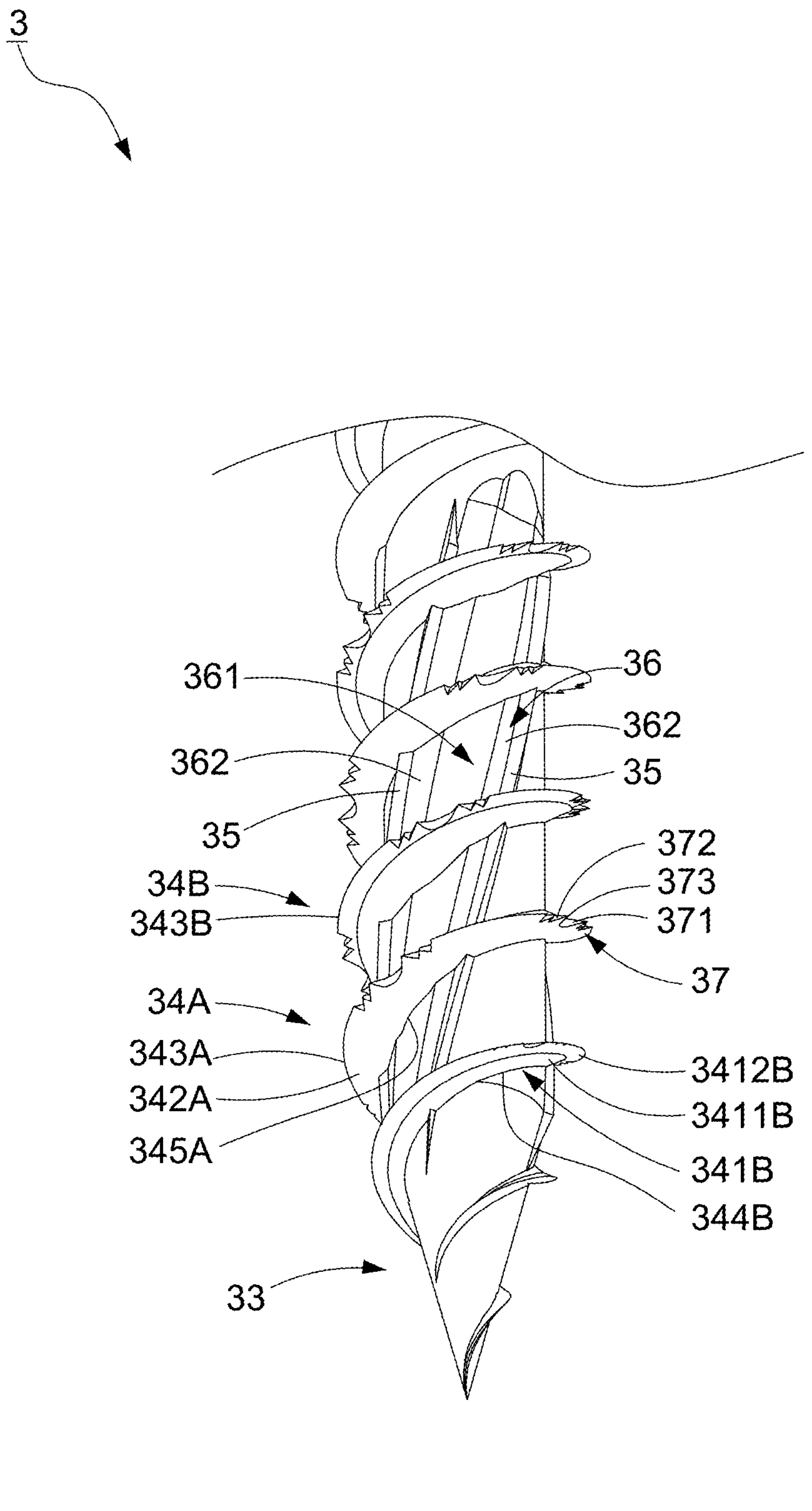
FIG. 4 is a schematic view showing partial elements of the first preferred embodiment of this invention.
Figure 5:
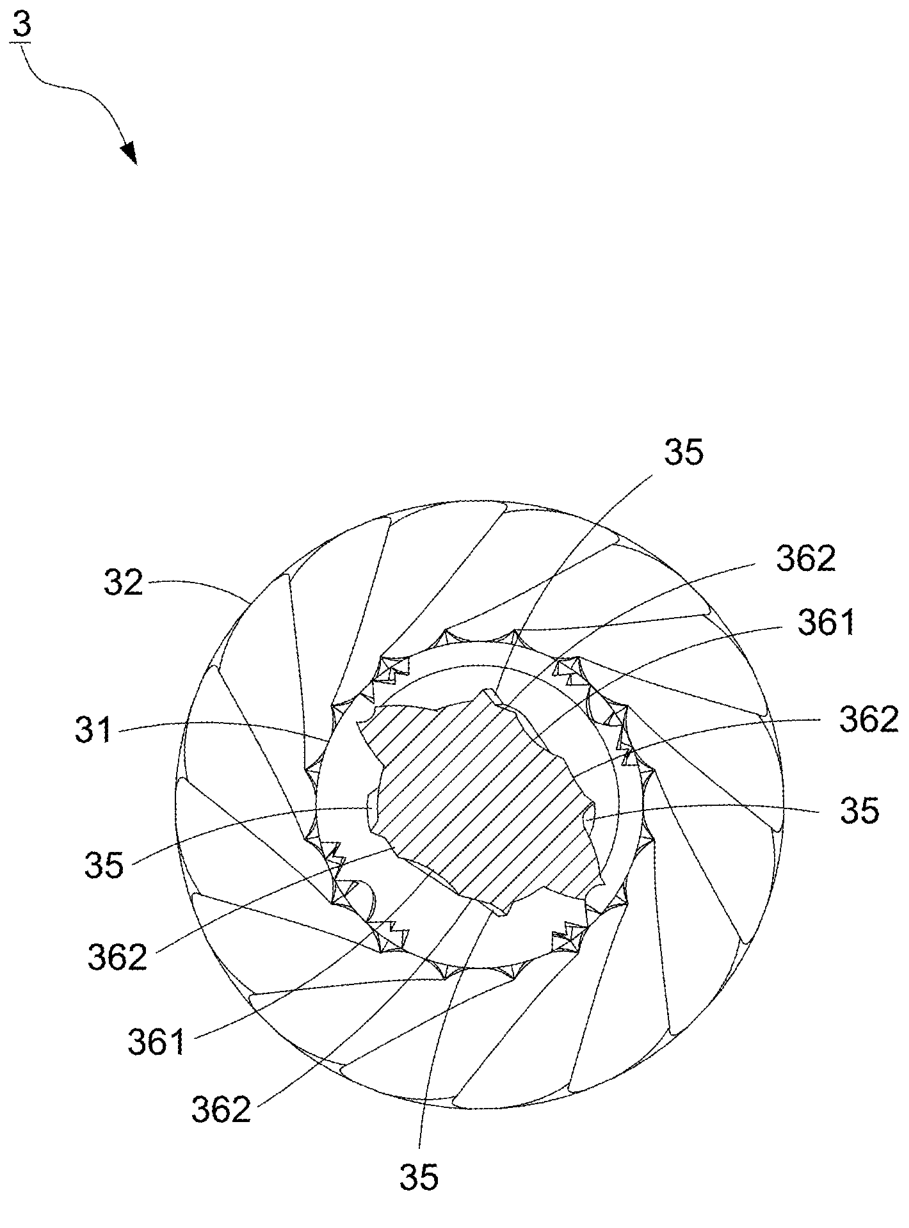
FIG. 5 is a cross-sectional view showing the ribs and the discharging portions.

Referring to FIGS. 3 and 4, in this preferred embodiment, the thread convolutions 34 include a first plurality of thread convolutions 34A, also referred to herein, for simplicity, as "first threads 34A" (for plural) or a "first thread 34A" (for singular). The thread convolutions 34 also include a second plurality of thread convolutions 34B, also referred to herein, for simplicity, as "second threads 34B" (for plural) or a "second thread 34B" (for singular). In short, the thread convolutions 34 can be divided into a plurality of first threads 34A and a plurality of second threads 34B formed between the first threads 34A. The first threads 34A and the second threads 34B are formed on the shank 31 separately without connection so that to provide a double threaded screw 3. Referring to the first threads 34A shown in FIGS. 6 and 6A, each first thread flank 341A of each first thread 34A faces the head 32. Each second thread flank 342A of each first thread 34A faces the drill portion 33. A reference line is defined between the first thread root 344A of each first thread flank 341A and the baseline R. The reference line is parallel to the central axis L of the shank 31. The length of the reference line is defined as a first vertical distance D1 in this preferred embodiment. Another reference line is also defined between the second thread root 345A of each second thread flank 342A and the baseline R. The reference line is parallel to the central axis L of the shank 31. The length of the reference line is defined as a second vertical distance D2 in this preferred embodiment. Preferably, the first vertical distance D1 is larger than the second vertical distance D2. Following a third vertical distance D3, a fourth vertical distance D4, a fifth vertical distance D5, and a sixth vertical distance D6 are defined by the length of respective reference line parallel to the central axis L of the shank 31. The first thread flank 341A of each first thread 34A has a first flank section 3411A connected to the first thread root 344A and a second flank section 3412A connected between the first flank section 3411A and the thread crest 343A. A first flank angle θ1 is defined between the first flank section 3411A and the baseline R. A second flank angle θ2 is defined between the second flank section 3412A and the baseline R. The first flank angle θ1 is larger than the second flank angle θ2.

Referring to the second threads 34B shown in FIGS. 6 and 6B, the first thread flank 341B of each second thread 34B faces the drill portion 33. The second thread flank 342B of each second thread 34B faces the head 32. A third vertical distance D3 is defined between the first thread root 344B and the baseline R. A fourth vertical distance D4 is defined between the second thread root 345B and the baseline R. The third vertical distance D3 can be larger than the fourth vertical distance D4. The first thread flank 341B of each second thread 34B has a first flank section 3411B connected to the first thread root 344B and a second flank section 3412B connected between the first flank section 3411B and the thread crest 343B. A third flank angle θ3 is defined between the first flank section 3411B and the baseline R. A fourth flank angle θ4 is defined between the second flank section 3412B and the baseline R. The third flank angle θ3 is larger than the fourth flank angle θ4.

Figure 7:
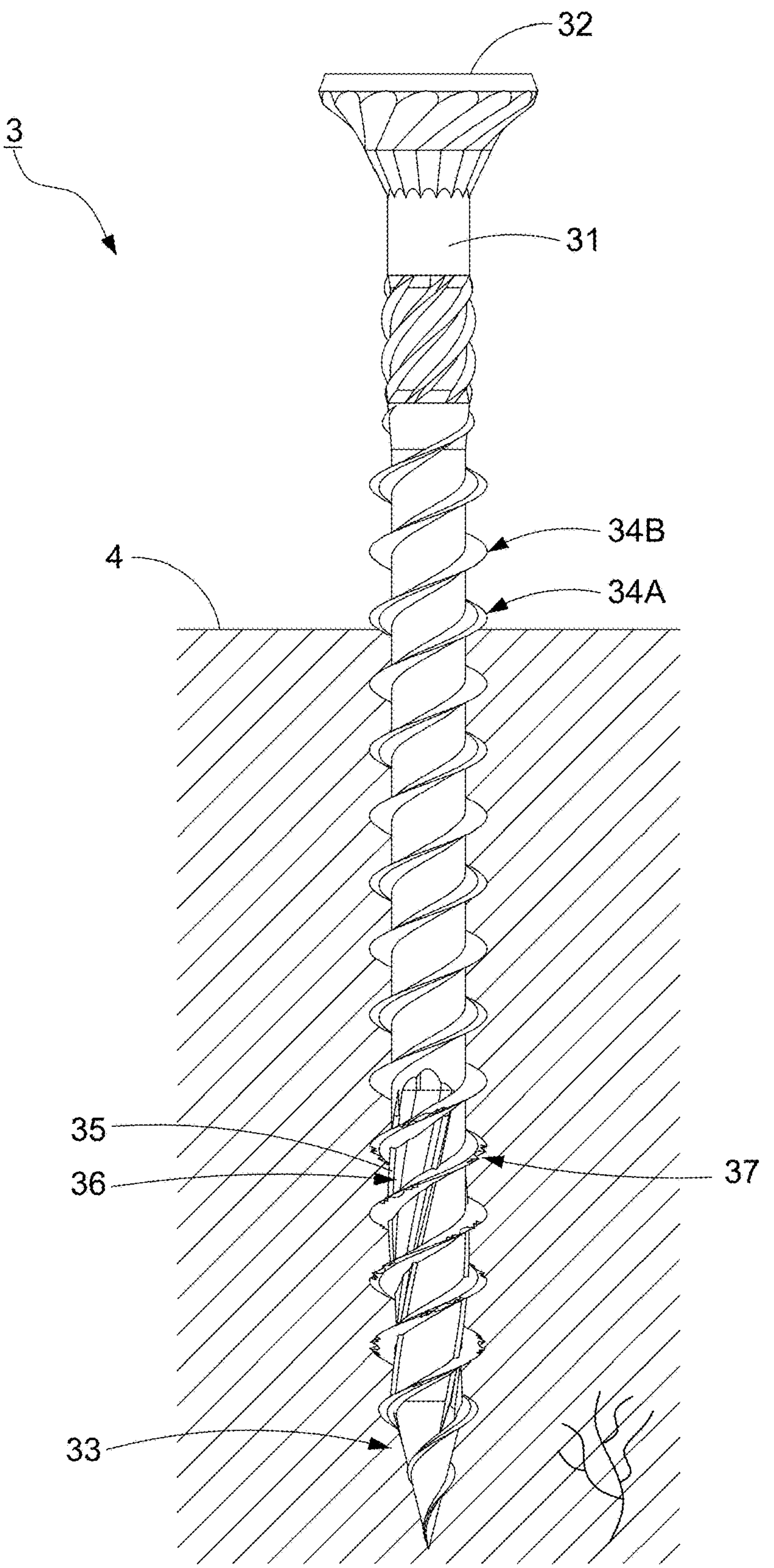
FIG. 7 is a schematic view showing a screwing operation of the first preferred embodiment of this invention.
Figure 8:
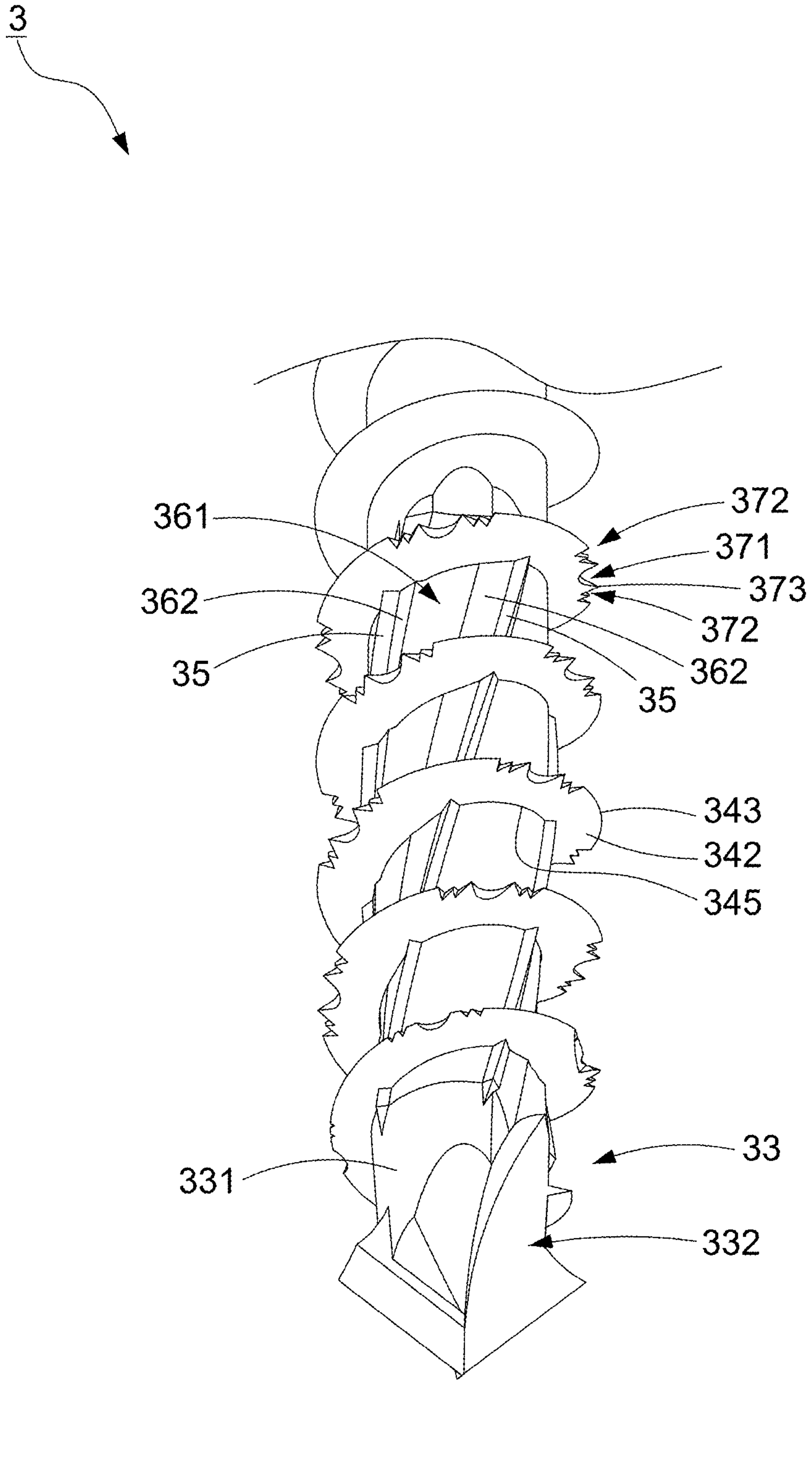
FIG. 8 is a schematic view showing a second preferred embodiment of this invention characterized by two slots of the drill portion.
Figure 9:
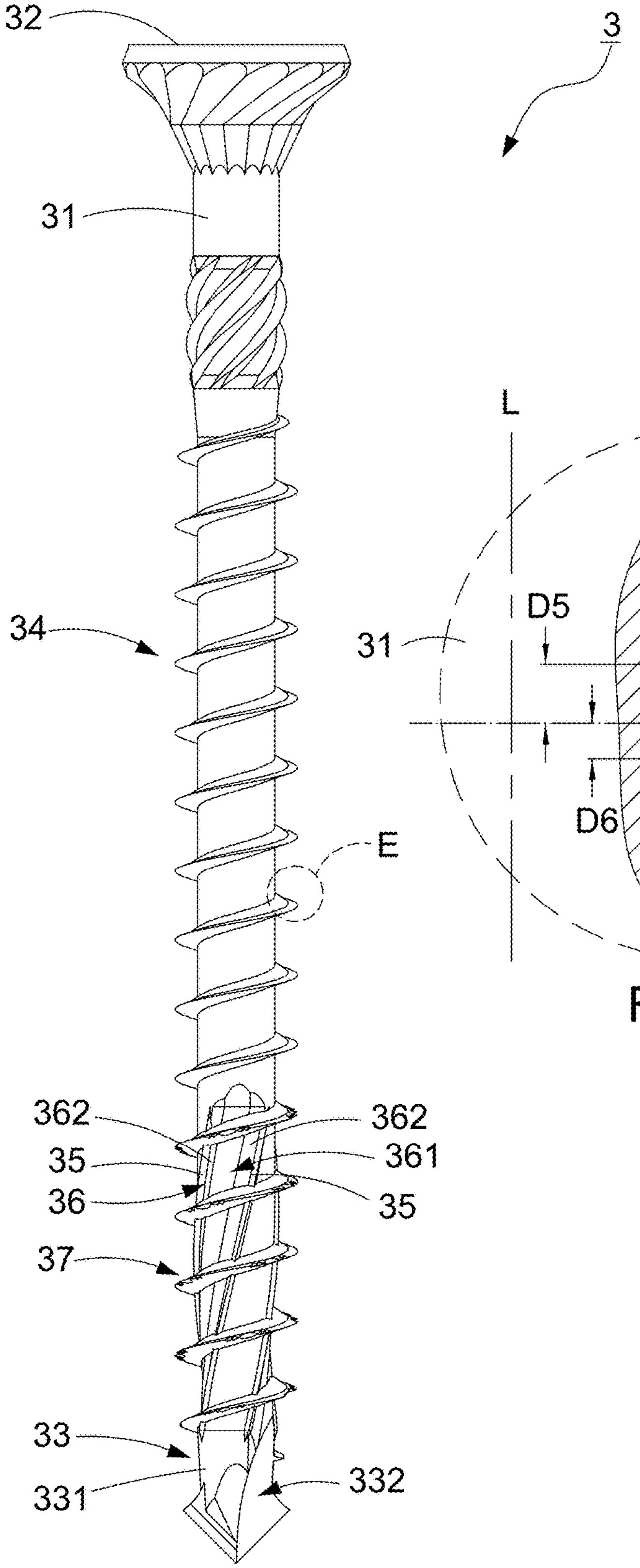
FIG. 9 is a schematic view showing the second preferred embodiment of this invention.
Figure 9A:
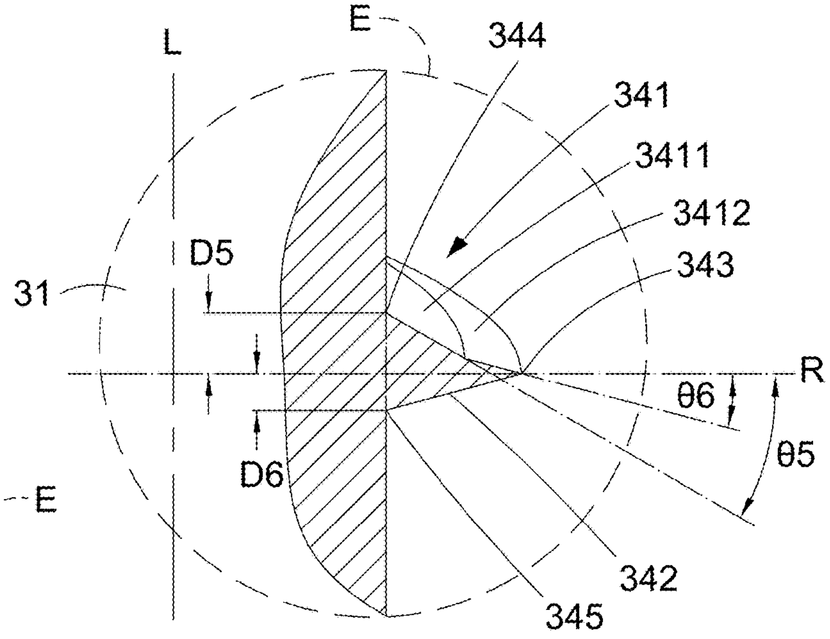
FIG. 9A is an enlarged views of the encircled portion E indicated in FIG. 9.
Figure 10:
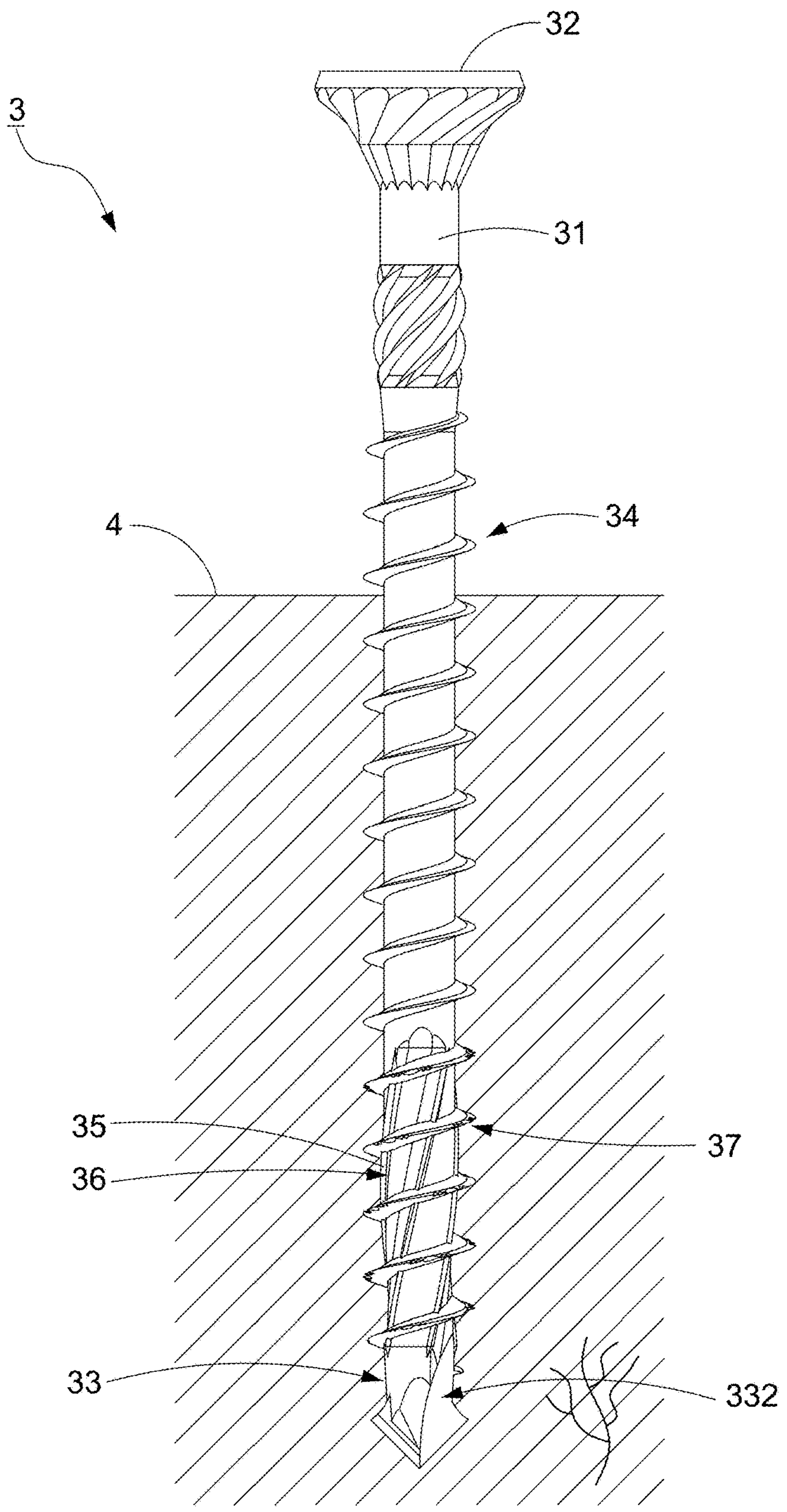
FIG. 10 is a schematic view showing a screwing operation of the second preferred embodiment of this invention.

Because the vertical distance defined between each first thread root (344, 344A, 344B) and the baseline R is different from the vertical distance defined between each second thread root (345, 345A, 345B) and the baseline R, each first thread flank (341, 341A, 341B) and each second thread flank (342, 342A, 342B) respectively extend in different inclined angles whereby asymmetric thread flanks are provided. Meanwhile, the flank angle defined between each first flank section (3411, 3411A, 3411B) and the baseline R is different from the flank angle defined between each second flank section (3412, 3412A, 3412B) and the baseline R, thereby allowing each first thread flank (341, 341A, 341B) to be formed by a multi-sectional structure whereby asymmetric flank sections are provided. Thus, the asymmetric arrangement is advantageous to increase the cutting efficiency of the thread convolutions 34 (namely the first threads 34A and the second threads 34B), attain a tight engagement, and increase the pull-out resistance of the screw 3 after a screwing operation is complete. The improved pull-out resistance ensures that the screw 3 is not easily pulled out of a workpiece 4 as shown in FIG. 7.

Referring to FIGS. 3, 3A and 4, each discharging portion 36 has an accommodation groove 361 extending between the thread convolutions 34 and two inclined surfaces 362 respectively connected to two sides of the accommodation groove 361. The two inclined surfaces 362 are also respectively connected to the two adjacent ribs 35 so that each inclined surface 362 is connected to one of the two adjacent ribs 35 and the accommodation groove 361. Thus, chips generated during a cutting operation of the ribs 35 are guided by the inclined surfaces 362 into the accommodation groove 361, and then moved outwards quickly. In this preferred embodiment, the cutting portions 37 are spaced from each other. Each cutting portion 37 has at least one first notch 371 and a plurality of second notches 372 formed on two sides of each first notch 371. Each first notch 371 is recessed into the thread crest 343 to thereby form two cutting edges 373. The first notch 371 of each cutting portion 37 is curved in shape in this preferred embodiment. Here takes an example that the second notches 372 are divided into groups. Each group includes two second notches 372 connected together. Each first notch 371 is defined between and connected to two groups of the second thereby forming the cutting edges 373 between the first notch 371 and the second notches 372 respectively.

Referring to FIGS. 3 to 7, during a screwing operation of the screw 3, the drill portion 33 is positioned against a surface of a workpiece 4. Then, the head 32 receives a rotational force in order to carry out a drilling operation of the drill portion 33 and a cutting operation of the thread convolutions 34 (namely the first threads 34A and the second threads 34B). During the cutting operation, the first notch 371, the second notches 372 and the cutting edges 373 of each cutting portion 37 and the ribs 35 formed on the shank 31 can help sever fibers of the workpiece 4 into chips, thereby increasing the cutting efficiency. The chips are then guided by the inclined surfaces 362 which are formed on two sides of the ribs 35 into the accommodation groove 361, and the chips are allowed to move outwards smoothly and speedily. The chips can also travel outwards quickly through the first notches 371 and the second notches 372. Accordingly, the inclined surfaces 362, the accommodation groove 361, the second notches 372, and the first notches 371 enlarge spaces for accommodating and excluding the chips, thereby moving the chips outwards effectively, lowering the screwing resistance, allowing the screw 3 to screw into the workpiece 4 speedily without being hindered by the chips, accelerating the screwing operation, and preventing the workpiece 4 from cracking caused by pressing unduly accommodated chips. The asymmetric arrangement of the thread convolutions 34 assists in enhancing the cutting efficiency, allowing the screw 3 to engage with the workpiece 4 tightly, and increasing the pull-out resistance after the screw 3 is screwed into the workpiece 4. After the screw 3 is embedded in the workpiece 4, the remainder of chips are received within the inclined surfaces 362, the accommodation groove 361, the second notches 372, and the first notches 371 duly, thereby attaining a tight engagement between the screw 3 and the workpiece 4, preventing the screw 3 from being easily pulled out of the workpiece 4, and achieving preferable anti-loosening effect.

Referring to FIGS. 8, 9, 9A and 10 shows a second preferred embodiment of the screw 3 of this invention. The correlated elements and the concatenation of elements, the operation and objectives of the second preferred embodiment are the same as those of the first preferred embodiment. This embodiment is characterized in that the drill portion 33 has a drill body 331 connected to the second end of the shank 31 and two opposite slots 332 recessed into the drill body 33. Each slots 332 is communicated with respective accommodation groove 361 of each discharging portion 36 whereby chips generated during a drilling operation of the drill portion 33 travel through the slots 332 into the accommodation groove 361 and move outwards smoothly. In this preferred embodiment, the screw 3 is a single threaded screw. Accordingly, the first thread flank 341 of each thread convolution 34 faces the head 32. The second thread flank 342 of each thread convolution 34 faces the drill portion 33. A fifth vertical distance D5 defined between the first thread root 344 and the baseline R is different from a sixth vertical distance D6 defined between the second thread root 345 and the baseline R. A fifth flank angle θ5 defined between the first flank section 3411 and the baseline R is different from a sixth flank angle θ6 defined between the second flank section 3412 and the baseline R. The type of the drill portion 33 can be varied according to needs such as a dill tail, a pointed tail, and so on. Here takes that the drill portion 33 is a drill tail as an example. While the drill portion 33 drills into a workpiece 4 in a drilling operation, chips caused by drilling the workpiece 4 are allowed to pass through and enter into the accommodation groove 361 with the aid of the slots 332, thereby moving the chips outwards quickly and accelerating the drilling operation. Further, sufficient chips are accommodated within the slots 332 whereby the screw 3 engages with the workpiece 4 tightly, and that prevents the screw 3 from being pulled out of the workpiece 4 easily.

To sum up, the screw of this invention takes an advantage that the discharging portion formed between any two adjacent ribs has two inclined surfaces respectively connected to the ribs and an accommodation groove. The thread convolutions are provided with the cutting portions. Accordingly, the ribs formed on the shank and the cutting portions are adapted to assist the thread convolutions in cutting the workpiece, thereby improving the cutting efficiency. The inclined surfaces are adapted to guide the chips into the accommodation groove, thereby moving the chips outwards quickly, reducing the screwing resistance, and increasing the screwing speed. The first thread root and the second thread root of each thread convolution respectively define different vertical distances with the baseline of the thread crest. And, the first flank section and the second flank section of each first thread flank define different flank angles with the baseline of the thread crest. The thread convolutions are provided with an asymmetric arrangement accordingly, thereby improving the cutting efficiency, attaining a tight engagement between the screw and the workpiece, and improving the pull-out resistance of the screw to prevent the screw from being pulled out of the workpiece easily. Sufficient chips are accommodated within the inclined surfaces, the accommodation groove, and the cutting portions whereby the screw engages with the workpiece tightly, and that prevents the screw from being loose or falling from the workpiece easily.

While the embodiments of this invention are shown and described, it is understood that further variations and modifications may be made without departing from the scope of this invention.

What is claimed is:

1. A screw comprising:

a shank having opposite first and second ends and defining a central axis;

a head joined to said first end of said shank;

a drill portion connected to said second end of said shank; and a plurality of thread convolutions spirally formed on said shank, wherein each of said plurality of thread convolutions includes opposite first and second thread flanks extending outwards from said shank, and a thread crest formed along a junction of said first thread flank and said second thread flank, said thread crest defining a baseline perpendicular to said central axis of said shank, said first thread flank and an outer periphery of said shank converging at a first thread root, said second thread flank and said outer periphery of said shank converging at a second thread root;

wherein a vertical distance defined between said first thread root and said baseline is different from a vertical distance defined between said second thread root and said baseline, said first thread flank of each of said plurality of thread convolutions including a first flank section connected to said shank and a second flank section connected to said first flank section, a flank angle defined between said first flank section and said baseline being different from a flank angle defined between said second flank section and said baseline, a plurality of cutting portions being formed on respective thread crests corresponding to at least two of said plurality of thread convolutions, a plurality of ribs being formed by protruding from said outer periphery of said shank and extending between said plurality of thread convolutions in an extension direction, said extension direction being non-parallel to said central axis of said shank, a discharging portion being formed between any two adjacent ribs, said discharging portion including two inclined surfaces respectively connected to said two adjacent ribs and an accommodation groove defined between said two inclined surfaces, with each said accommodation groove extending between said plurality of thread convolutions, thereby guiding chips caused by cutting a workpiece with said plurality of ribs into said accommodation groove with the aid of said two inclined surfaces to facilitate the removal of said chips.

2. The screw according to claim 1, said first thread flank of each of said plurality of thread convolutions faces said head.

3. The screw according to claim 1, said plurality of thread convolutions include a first plurality of thread convolutions and a second plurality of thread convolutions formed between said first plurality of thread convolutions, each said first thread flank of each of said first plurality of thread convolutions facing said head, each said first thread flank of each of said second plurality of thread convolutions facing said drill portion.

4. The screw according to claim 1, wherein said vertical distance defined between said first thread root and said baseline is greater than said vertical distance defined between said second thread root and said baseline.

5. The screw according to claim 1, wherein said flank angle defined between said first flank section and said baseline is greater than said flank angle defined between said second flank section and said baseline.

6. The screw according to claim 1, wherein said drill portion has a drill body connected to said second end of said shank and two opposite slots recessedly formed on said drill body, said two slots being each communicated with each said accommodation groove of each said discharging portion, thereby guiding chips caused by cutting said workpiece with said drill portion into said accommodation groove with the aid of said two slots.

7. The screw according to claim 1, wherein each of said plurality of cutting portions has at least one first notch and a plurality of second notches formed on two sides of each of said at least one first notch, each of said at least one first notch being recessed into said thread crest, each said first notch thereby defining two cutting edges.

8. The screw according to claim 7, wherein said plurality of cutting portions are spaced from each other, said at least one first notch being curved in shape.

* * * * *